(12) United States Patent
Håkansson et al.

(10) Patent No.: US 11,824,425 B2
(45) Date of Patent: Nov. 21, 2023

(54) ELECTRIC MACHINE

(71) Applicant: Volvo Car Corporation, Gothenburg (SE)

(72) Inventors: Emil Håkansson, Gothenburg (SE); Johan Andersson, Gothenburg (SE); Joakim Ehn, Gothenburg (SE); Robin Reinfjell, Gothenburg (SE)

(73) Assignee: VOLVO CAR CORPORATION

( * ) Notice: Subject to any disclaimer, the term of this patent is extended or adjusted under 35 U.S.C. 154(b) by 143 days.

(21) Appl. No.: 17/167,735

(22) Filed: Feb. 4, 2021

(65) Prior Publication Data
US 2022/0247271 A1   Aug. 4, 2022

(51) Int. Cl.
  *H02K 1/32* (2006.01)
  *H02K 9/06* (2006.01)
  *H02K 9/19* (2006.01)

(52) U.S. Cl.
  CPC ............. *H02K 9/06* (2013.01); *H02K 1/32* (2013.01); *H02K 9/19* (2013.01)

(58) Field of Classification Search
  CPC .. H02K 5/20; H02K 5/02; H02K 5/04; H02K 5/08; H02K 41/031; H02K 1/193; H02K 1/32; H02K 1/20; H02K 9/16; H02K 9/19; H02K 9/18; H02K 9/197; H02K 9/20; H02K 9/06; H02K 9/14
  See application file for complete search history.

(56) References Cited

U.S. PATENT DOCUMENTS

| | | | | |
|---|---|---|---|---|
| 3,764,236 A | * | 10/1973 | Carter | F04D 29/049 417/372 |
| 5,692,886 A | * | 12/1997 | Kobayashi | F04D 29/0413 417/423.1 |
| 6,102,674 A | * | 8/2000 | Strauch | F04D 29/049 417/423.12 |

(Continued)

FOREIGN PATENT DOCUMENTS

| | | |
|---|---|---|
| CN | 109921555 A | 6/2019 |
| CN | 109962578 A | 7/2019 |

(Continued)

OTHER PUBLICATIONS

Partial European Search Report received for EP Patent Application Serial No. 22153555.2 dated Jul. 7, 2022, 19 pages.

(Continued)

*Primary Examiner* — Bryan R Perez
(74) *Attorney, Agent, or Firm* — Amin, Turocy & Watson, LLP (57) ABSTRACT

A rotor assembly for an electric machine is described herein. The rotor assembly comprises a body member, a first shaft member and a second shaft member. The body member comprises an inner wall defining a cavity in the body member. The body member is arranged between the first shaft member and the second shaft member. The first shaft member comprises a tube arranged through the first shaft member and extending at least partially in the cavity of the body member. An end of the tube exposed in the cavity comprises a medium dispersion unit configured to disperse a medium in the cavity and the medium dispersion unit comprises an impeller element configured to provide a turbulent flow of the medium.

20 Claims, 5 Drawing Sheets

(56) References Cited

U.S. PATENT DOCUMENTS

| | | | |
|---|---|---|---|
| 6,191,511 B1* | 2/2001 | Zysset .................... | H02K 9/197 310/59 |
| 2003/0146667 A1 | 8/2003 | Hattori et al. | |
| 2014/0126606 A1 | 5/2014 | Ito et al. | |
| 2015/0288255 A1 | 10/2015 | Luke et al. | |
| 2020/0076257 A1* | 3/2020 | Piazza Galarza ........ | H02K 7/14 |

FOREIGN PATENT DOCUMENTS

| | | |
|---|---|---|
| DE | 10 2017 214 507 A1 | 2/2019 |
| DE | 102017218351 A1 | 4/2019 |
| JP | 2009118686 A | 5/2009 |
| WO | 2017/050447 A1 | 3/2017 |
| WO | 2017/214232 A1 | 12/2017 |
| WO | 2019/072489 A1 | 4/2019 |
| WO | WO-2019072489 A1 * | 4/2019 |

OTHER PUBLICATIONS

Extended European Search Report received for European Patent Application Serial No. 22153555.2 dated Oct. 25, 2022, 19 pages.

* cited by examiner

```
┌─────────────────────────────────┐
│ Providing a body member          │
│ comprising an inner wall         │──── S1
│ defining a cavity in the         │
│ body member                      │
└─────────────────────────────────┘
                 │
┌─────────────────────────────────┐
│ arranging the body member        │
│ between a first shaft member     │
│ and a second shaft member,       │
│ the first shaft member           │──── S2
│ comprising a tube, the tube      │
│ extending at least partially in  │
│ the cavity of the body member    │
└─────────────────────────────────┘
                 │
┌─────────────────────────────────┐
│ providing a medium dispersion    │
│ unit comprising an impeller      │──── S3
│ element at an end of the tube    │
│ exposed in the cavity            │
└─────────────────────────────────┘
```

Fig. 5

ELECTRIC MACHINE

TECHNICAL FIELD

One or more embodiments herein relates to a rotor assembly for an electric machine, an electric machine comprising such a rotor assembly, a vehicle comprising such an electric machine and a manufacturing method for such a rotor assembly.

BACKGROUND ART

Electric machines are used in electric or hybrid vehicles as a traction motor. The traction motor in vehicles is generally configured to generate power for providing a wheel torque to propel the vehicle and to recover braking energy if a regenerative braking system is used. Such electric machines may however produce significant heat inside them. For example, heat may be generated in an electric machine due to an electric resistance in electric current flowing through a rotor and/or stator, hysteresis losses due to changing magnetic fields and resistive heating of eddy currents caused by magnetic fields. Additionally, heat may be also generated due to mechanical friction among components in the electric machine.

In electric machines, however, thermal capacities of rotor magnets and stator windings affect available output power of the electric machines. The rotor magnets typically have a thermal limit of 150° C. and when temperature increases above the thermal limit, demagnetization may occur which reduces performance of the electric machine.

SUMMARY

There may be a need to provide an improved electric machine, which facilitates an efficient heat transfer.

The problem is solved by the subject matters of the independent claims of the present disclosure, wherein further embodiments are incorporated in the dependent claims. It should be noted that the aspects of the disclosure described in the following apply to the rotor assembly for an electric machine, an electric machine comprising such a rotor assembly, a vehicle comprising such an electric machine and a manufacturing method for such a rotor assembly.

According to the present disclosure, a rotor assembly is presented. The rotor assembly comprises a body member, a first shaft member and a second shaft member. The body member comprises an inner wall defining a cavity in the body member. The body member is arranged between the first shaft member and the second shaft member. The first shaft member comprises a tube, which is arranged through the first shaft member and extends at least partially in the cavity of the body member. An end of the tube exposed in the cavity comprises a medium dispersion unit configured to disperse a medium in the cavity and the medium dispersion unit comprises an impeller element configured to provide a turbulent flow of the medium.

The rotor assembly according to the present disclosure may increase a heat transfer in the rotor assembly by providing a turbulent medium flow inside the rotor assembly. The medium may be in a gas state, a liquid state or a mixing state of gas and liquid. The medium may be water, oil, air or water vapour or the like. The medium may be selected so that it is suitable for transferring heat. In a turbulent flow, the medium may undergo irregular fluctuations or mixing and its speed may be continuously changed in both magnitude and direction. Accordingly, heat transfer inside the rotor assembly may be significantly improved and a thermal management of the rotor assembly may be facilitated. Furthermore, the well-dispersed turbulent flow of the medium may allow a reduction of frictions among components of the rotor assembly.

The body member of the rotor assembly may be formed essentially in a cylinder shape. The body member may comprise a plurality of magnets arranged around an outer surface of the body member. The magnets may be permanent magnets and configured to rotate the body member due to electromagnetic energy. The body member may comprise a first end portion and a second end portion. Between the first end portion and the second end portion a cylindrical cavity may be formed, which may extend from the first end portion and the second end portion of the body member. In other words, the body member may comprise the inner wall extending from the first end portion and the second end portion of the body member, thereby defining the cavity.

At the first end portion of the body member the first shaft member may be arranged and at the second end portion of the body member the second shaft member may be arranged. The first shaft member may be fixedly attached to the first end portion of the body member and/or the second shaft member may be fixedly attached to the second end portion of the body member. Alternatively, the first shaft member, the body member and the second shaft member may be manufactured integrally thereby form a single piece. The first shaft member and the second shaft member may extend along the same longitudinal axis, which may also correspond to a rotation axis of the rotor assembly. However, the first shaft member and/or the second shaft member may also be arranged offset relative to the rotation axis of the rotor assembly.

The tube may be inserted through the first shaft member and it may extend at least partially in the cavity of the body member. In other words, the tube may be mounted coaxially within the first shaft member but the tube may further extend in direction to the second shaft member inside the cavity, for example essentially to a centre of the body member of the rotor assembly.

Alternatively, the tube and the first shaft member may be manufactured integrally thereby form a single piece. In such a case, the first shaft member may be tubularly formed, wherein a diameter of the first shaft member extending outwardly from the first end portion of the body member may be bigger than the diameter of the first shaft member positioned in the cavity of the body member. However, the diameter of the first shaft member extending outwardly from the first end portion of the body member may be same as or smaller than the diameter of the first shaft member positioned in the cavity of the body member.

In an embodiment, the tube may be connected to a pump unit to provide the medium such as a coolant in the cavity of the body member. Accordingly, the end of the tube exposed in the cavity may be opened to disperse the medium supplied through the tube or the first shaft member. However, to distribute the medium efficiently in the cavity, the medium dispersion unit may be arranged at the end of the tube. The medium dispersion unit may be any suitable means to diffuse the medium in the cavity. Among them, the medium dispersion unit may preferably comprise an impeller element. The impeller element may be understood as a propeller-shaped element configured to increase a pressure and/or a flow rate of a medium to be released. Accordingly, the impeller element may generate the turbulent flow of the medium when distributing it in the cavity of the body member. This may result in an efficient heat transfer between the rotor assembly, in particular the magnets, and the medium In an embodiment, the impeller element is arranged to rotate around a longitudinal axis of the tube. The impeller element may be configured to disperse the medium all around the cavity of the body member. Accordingly, the medium dispersion unit may be arranged essentially to the centre of the body member and the medium dispersion unit may rotate around the longitudinal axis of the tube to apply a centrifugal force on the medium, thereby improving the distribution of the medium in the cavity.

In an embodiment, the impeller element comprises a plurality of fins configured to provide the turbulent flow of the medium. The impeller element may comprise a plurality of blades or fins arranged essentially in a radial direction of the tube. The plurality of fins may be curved, bent or skewed to increase the turbulent flow of the medium.

In an embodiment, the medium dispersion unit further comprises a nozzle configured to determine a flow rate of the medium. The nozzle may be arranged between the impeller element and the tube. The nozzle may be configured to control the flow rate of the medium fed in the cavity through the tube. Preferably, the nozzle may be configured to increase the flow rate of the medium such that the turbulent flow of the medium may be facilitated.

In an embodiment, a diameter of the nozzle is smaller than a diameter of the tube. Since the medium may be provided steadily by means of the pump unit, the nozzle may contribute to a pressure increase of the medium, which may lead to a flow rate increase. Consequently, the nozzle may facilitate creating the turbulent flow of the medium at the impeller element.

In an embodiment, the medium dispersion unit further comprises a plug element to cover the impeller element in a longitudinal direction of the tube such that the medium is dispersed in a radial direction of the tube. The plug element may act as a lid and it may be mounted against the impeller element along the longitudinal direction of the tube. Accordingly, the impeller element may disperse the medium only in the radial direction of the tube or in a perpendicular direction relative to the longitudinal axis of the tube and a direct jet of the medium in a direction of the second end portion of the body member may be prevented.

In an embodiment, the medium dispersion unit is connected to the tube in a form-fitted manner Additionally, the impeller element, the nozzle and the plug element may be connected to each other by means of form fitting, which may facilitate the assembly and/or disassembly. However, the medium dispersion unit may be also connected by an alternative method such as screwing, soldering, gluing etc. When connecting the medium dispersion unit to the tube, it is important to assemble it firmly such that no components of the medium dispersion unit may become loose during dispersing the medium in the cavity of the body member.

In an embodiment, the first shaft member further comprises a plurality of through-holes arranged in a circumferential direction of the first shaft member. The plurality of through-holes may be arranged spaced apart from one another along a radial direction of the first shaft member. The plurality of through-holes may be formed by means of a drilling element. The plurality of through-holes may be configured to allow heat transfer in the rotor assembly.

In an embodiment, some of the plurality of through-holes extend to the cavity along a longitudinal direction of the first shaft member. In other words, some through-holes may form passages between the first shaft member and the cavity of the body member. In an embodiment, the through-holes are in fluid communication with the cavity. Accordingly, via the through-holes, the medium or coolant may be provide into the cavity such that the centre of the body member or rotor assembly may be cooled, which would improve the performance of the rotor assembly.

In an embodiment, the first shaft member further comprises a bore extending in a radial direction of the first shaft member and the bore is in fluid communication with one of the through-holes. The bore may also be formed by means of a drilling element. The bore may abut on the through-hole, which may not extend in the cavity. In other words, the through-hole may be redirected outside the first shaft member via the bore to provide the medium and cool outside the rotor assembly. The first shaft member may comprise more than one bore arranged in the radial direction of the first shaft member, wherein each bore may be connected to each through-hole respectively.

In an embodiment, the inner wall of the body member is formed in a conical shape. In other words, the cavity of the body member may comprise a conical shape. Preferably, a diameter of the cavity at the second end portion of the body member may be bigger than the dimeter of the cavity at the first end portion of the body member. In other words, the cavity may become gradually bigger from the first end portion to the second end of the body member.

In an embodiment, the body member comprises a channel extending from the cavity to an outside of the body member to release the medium. Accordingly, the medium dispersed from the impeller element to the cavity may be removed through the channel. In an embodiment, the channel may be arranged at the second end portion of the body member. Hence, the medium, which absorbs heat from the cavity or the inner wall conducting heat from the magnets to the cavity, may be collected at the second end portion of the body member. The body member may comprise more than one channel at the second end portion of the body member to release the medium.

A release of the medium out of the rotor assembly may be even more facilitated if the cavity may become gradually bigger from the first end portion to the second end of the body member. Due to the conical shape of the inner wall of the body member, the medium may be easily collected at the second end portion of the body member and the channel arranged at the second end portion may readily release the collected medium.

In an embodiment, the medium is an oil. The oil may be any lubricant, which may be adapted to reduce friction and heat between surfaces in mutual contact. The oil, which may be provided in a form of fine drops building a turbulent flow, may allow an efficient heat transfer in the cavity of the rotor assembly.

According to the present disclosure, a further rotor assembly for an electric machine is presented. The rotor assembly comprises a body member, a first shaft member and a second shaft member. The body member comprises an inner wall defining a cavity in the body member. The body member is arranged between the first shaft member and the second shaft member. The first shaft member comprises a plurality of through-holes. The plurality of through-holes are arranged in a circumferential direction of the first shaft member and some of the through-holes extend to the cavity along a longitudinal direction of the first shaft member.

The body member of the rotor assembly may be formed essentially in a cylinder shape. The body member may comprise a plurality of magnets arranged around an outer surface of the body member. The magnets may be permanent magnets and configured to rotate the body member due to electromagnetic energy. The body member may comprise a first end portion and a second end portion. Between the first end portion and the second end portion a cylindrical cavity may be formed, which may extend from the first end portion and the second end portion of the body member. In other words, the body member may comprise the inner wall extending from the first end portion and the second end portion of the body member, thereby defining the cavity.

At the first end portion of the body member the first shaft member may be arranged and at the second end portion of the body member the second shaft member may be arranged. The first shaft member may be fixedly attached to the first end portion of the body member and/or the second shaft member may be fixedly attached to the second end portion of the body member. Alternatively, the first shaft member, the body member and the second shaft member may be manufactured integrally thereby form a single piece. The first shaft member and the second shaft member may extend along the same longitudinal axis, which may also correspond to a rotation axis of the rotor assembly. However, the first shaft member and/or the second shaft member may also be arranged offset relative to the rotation axis of the rotor assembly.

The plurality of through-holes may be arranged spaced apart from one another in the first shaft member along a radial or circumferential direction of the first shaft member. The plurality of through-holes may be formed by means of a drilling element. Since the medium, preferably oil, may be spun up in the cavity, an efficient heat transfer in the cavity of the rotor assembly may be achieved. Moreover, an inertia of the shaft members may be reduced.

In an embodiment, each of the through-holes comprises a nozzle arranged in direction of the cavity to provide a turbulent flow of the medium in the cavity. An end of each through-hole exposed in the cavity may comprise a nozzle through which the medium may be ejected in the cavity. The medium may be provided via the first shaft member at a pre-defined flow rate, which may be connected to a pump means. The nozzle may be configured to increase the flow rate by decreasing a diameter of its opening. By increasing the flow rate of the medium, a turbulent inflow of the medium in the cavity may be generated, which may improve the heat transfer in the cavity. In an embodiment, each of the through-holes may also comprise a spraying means arranged in direction of the cavity to provide a turbulent flow of the medium in the cavity.

In an embodiment, the first shaft member further comprises a bore extending in a radial direction of the first shaft member, the bore being in fluid communication with one of through-holes. The bore may also be formed by means of a drilling element. The bore may abut on the through-hole, which may not extend in the cavity. In other words, the through-hole may be redirected outside the first shaft member via the bore to provide the medium and cool outside the rotor assembly. The first shaft member may comprise more than one bore arranged in the radial direction of the first shaft member, wherein each bore may be connected to each through-hole respectively.

In an embodiment, the inner wall of the body member is formed in a conical shape. In other words, the cavity of the body member may comprise a conical shape. Preferably, the cavity may become gradually bigger from the first end portion of the first shaft member to the second end portion of the second shaft member.

In an embodiment, the body member comprises a channel extending from the cavity to an outside of the body member to release the medium. In an embodiment, the channel may be arranged at the second end portion of the body member. Hence, the medium, which absorbs heat may be collected at the second end portion of the body member. The body member may comprise more than one channel at the second end portion of the body member to release the medium.

Accordingly, a release of the medium out of the rotor assembly may be even more facilitated if the cavity may become gradually bigger from the first end portion to the second end of the body member. Due to the conical shape of the inner wall of the body member, the medium may be easily collected at the second end portion of the body member and the channel arranged at the second end portion may readily release the collected medium.

According to the present disclosure, an electric machine is presented. The electric machine comprises a stator unit and a rotor assembly. The rotor assembly comprises a body member, a first shaft member and a second shaft member. The body member comprises an inner wall defining a cavity in the body member. The body member is arranged between the first shaft member and the second shaft member. The first shaft member comprises a tube and the tube is arranged through the first shaft member and extending at least partially in the cavity of the body member. An end of the tube exposed in the cavity comprises a medium dispersion unit configured to disperse a medium in the cavity and the medium dispersion unit comprises an impeller element configured to provide a turbulent flow of the medium. The rotor assembly is arranged coaxially inside the stator unit and configured to rotate around a longitudinal axis of the electric machine.

Hence, heat, which may be generated in the electric machine due to electric resistances and/or mechanical friction among components, may be transferred to the medium and the electric machine may be efficiently cooled. Furthermore, a balancing of the rotor assembly in the electric machine may be improved and an inertia of the rotor assembly may be reduced.

In an embodiment, the body member of the rotor assembly comprises a channel extending from the cavity to an outside of the body member to release the medium from the body member to the stator unit. The inner wall of the body member is formed in a conical shape. Accordingly, a release of the medium out of the rotor assembly may be even more facilitated if the cavity may be formed in a conical shape. Hence, not only the rotor assembly but also the stator unit surrounding the rotor assembly may be cooled and a thermal management in the electric machine may be improved.

According to the present disclosure, a vehicle is presented. The vehicle comprises an electric machine with a stator unit and a rotor assembly. The rotor assembly comprises a body member, a first shaft member and a second shaft member. The body member comprises an inner wall defining a cavity in the body member. The body member is arranged between the first shaft member and the second shaft member. The first shaft member comprises a tube and the tube is arranged through the first shaft member and extending at least partially in the cavity of the body member. An end of the tube exposed in the cavity comprises a medium dispersion unit configured to disperse a medium in the cavity and the medium dispersion unit comprises an impeller element configured to provide a turbulent flow of the medium. The rotor assembly is arranged coaxially inside the stator unit and configured to rotate around the longitudinal axis of the electric machine.

In an embodiment, the vehicle is a battery electric vehicle or a hybrid electric vehicle. In such vehicles, the electric machine may act as a traction motor supply power to wheels to propel the vehicle. The traction motor may however produce significant heat inside the electric machine. The vehicle according to the present disclosure allows an improved thermal management of the electric machine by generating a turbulent flow of the medium or coolant inside the rotor assembly.

According to the present disclosure, also a manufacturing method for a rotor assembly for an electric machine is presented. The manufacturing method comprises, but not necessarily in this order providing a body member comprising an inner wall defining a cavity in the body member, arranging the body member between a first shaft member and a second shaft member, the first shaft member comprising a tube, the tube extending at least partially in the cavity of the body member, and providing a medium dispersion unit comprising an impeller element at an end of the tube exposed in the cavity, wherein the medium dispersion unit is configured to disperse a medium in the cavity and the impeller element is configured to provide a turbulent flow of the medium.

It should be noted that the above embodiments may be combined with each other irrespective of the aspect involved. Accordingly, the method may be combined with structural features and, likewise, the system may be combined with features described above with regard to the method.

These and other aspects of the present embodiments will become apparent from and elucidated with reference to the embodiments described hereinafter.

BRIEF DESCRIPTION OF DRAWINGS

Exemplary embodiments will be described in the following with reference to the following drawings.

DESCRIPTION OF EMBODIMENTS

Figure 1:
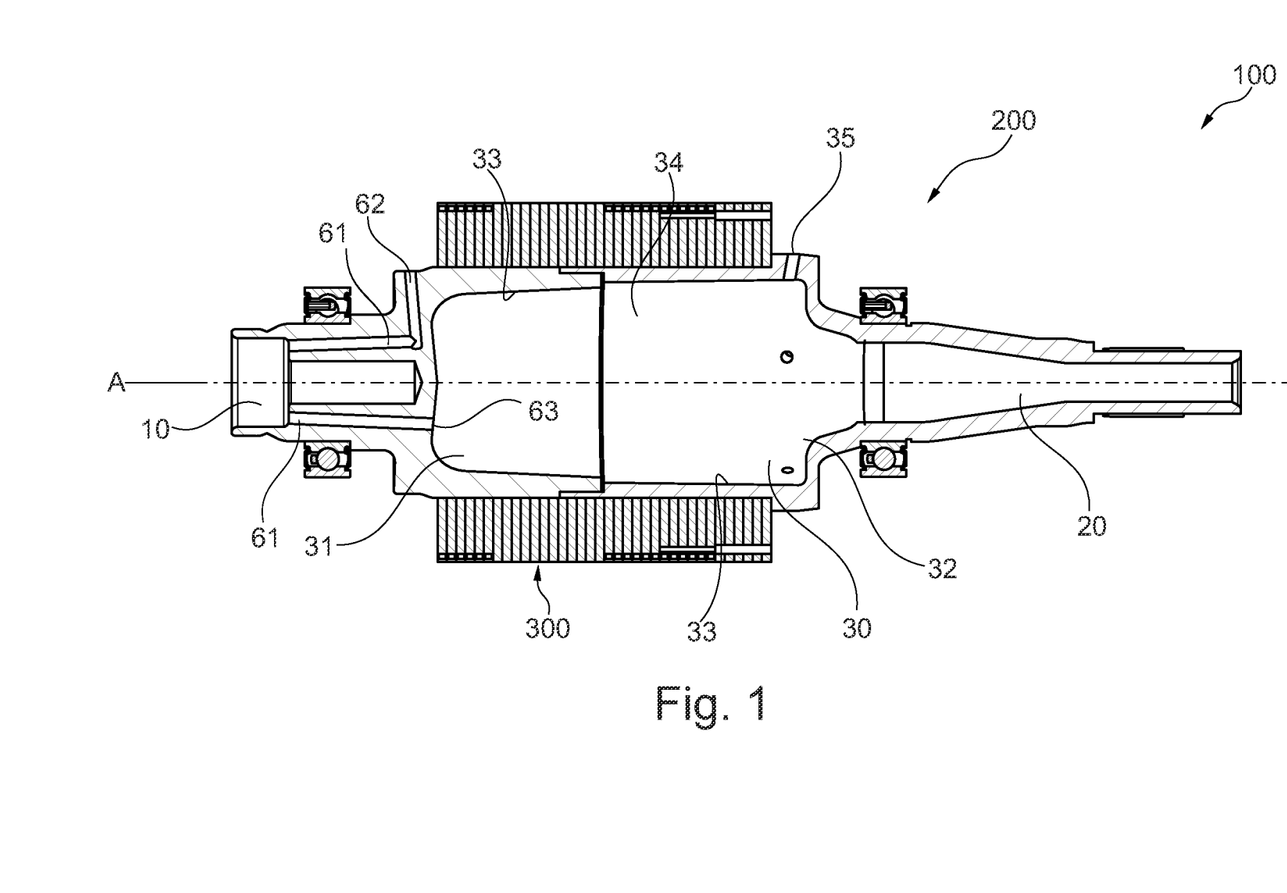
FIG. 1 shows schematically and exemplarily an embodiment of an electric machine according to the present disclosure.

FIG. 1 shows an electric machine 100, which may be mounted in a battery electric vehicle (BEV) or a hybrid electric vehicle (HEV) to provide kinetic energy to wheels of the vehicle, accordingly to propel the vehicle. Hence, the electric machine 100 acts as a traction motor, which generates, however, significant heat due to electromagnetic resistance or friction among components of the electric machine 100. The electric machine 100 comprises a stator unit 300 and a rotor assembly 200. The rotor assembly 200 is arranged coaxially inside the stator unit 300 and configured to rotate around a longitudinal axis A of the electric machine 100 whereas the stator unit 300 is arranged stationarily.

The rotor assembly 200 comprises a body member 30, a first shaft member 10 and a second shaft member 20. The body member 30 is arranged between the first shaft member 10 and the second shaft member 20 and the body member 30, the first shaft member 10 and the second shaft member 20 are arranged long the longitudinal axis A of the electric machine 100. The first shaft member 10 may be arranged at a non-drive end side of the electric machine 100. In other words, the second shaft member 20 may be connected to a drive unit of the vehicle to provide the kinetic energy.

The body member 30 comprises a first end portion 31 coupled with the first shaft member 10 and the second end portion 32 coupled with the second shaft member 20. The body member 30 further comprises an inner wall 33 defining a cavity 34 in the body member 30, wherein the inner wall 33 is formed in a conical shape. The conical shape is adapted such that a diameter of the cavity 34 at the first end portion 31 of the body member 30 is smaller than a diameter of the cavity 34 at the second end portion 32 of the body member 30. In other words, the cavity 34 may become gradually bigger from the first end portion 31 to the second end of the body member 30. Additionally, the body member 30 comprises a channel 35 extending form the cavity 34 to an outside of the body member 30 to release a medium 60, preferably in the direction of the stator unit 300 to further cool the stator unit 300.

Figure 2:
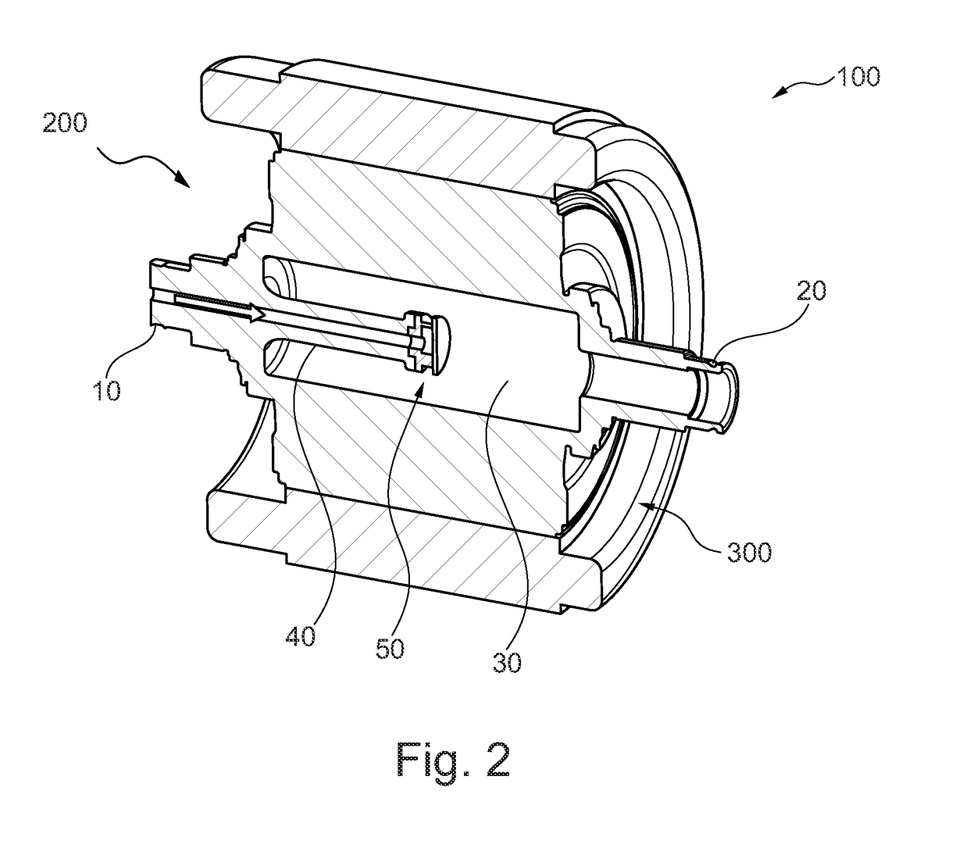
FIG. 2 shows schematically and exemplarily an embodiment of a rotor assembly according to the present disclosure.

As shown in FIG. 2, the first shaft member 10 comprises a tube 40 arranged through the first shaft member 10 and extending at least partially in the cavity 34 of the body member 30, preferable to a centre of the body member 30. The tube 40 is configured to supply the medium 60 or coolant such as water, air, preferably oil to transfer heat generated inside the electric machine 100 and reduce friction among components. An end 41 of the tube 40 exposed in the cavity 34 comprises a medium dispersion unit 50. Another end of the tube 40 arranged outside the body member 30 may be connected to a pump unit to supply the medium 60 continuously.

Figure 3A:
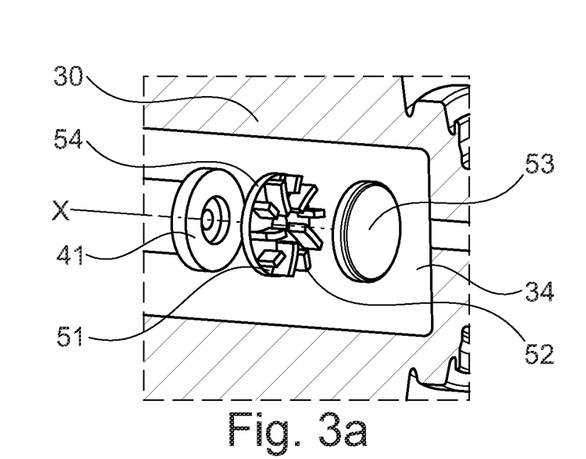
FIGS. 3a-3d show schematically and exemplarily an embodiment of a medium dispersion unit according to the present disclosure.
Figure 3B:
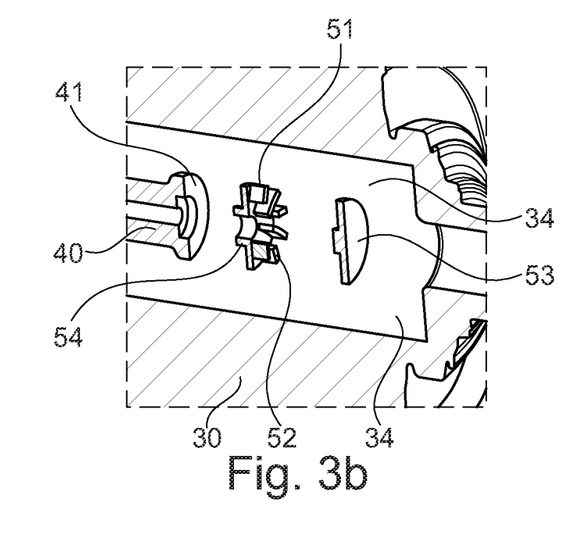
Figure 3C:
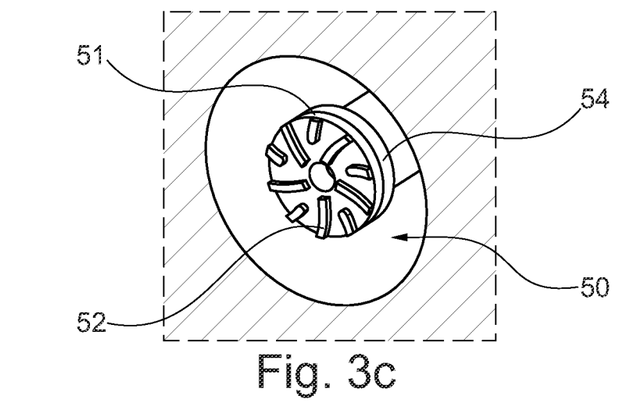

The medium dispersion unit 50 is configured to distribute the medium 60 in the cavity 34 efficiently. The medium dispersion unit 50 may be connected to the tube 40 in a form-fitted manner. The medium dispersion unit 50 comprises an impeller element 51 arranged between a plug element 53 and a nozzle 54 (see FIG. 3a and FIG. 3b). The impeller element 51 is configured to provide a turbulent flow of the medium 60, hence, comprises a plurality of fins 52 arranged in a radial direction of the tube 40 (see FIG. 3c). The plurality of fins 52 may be curved, bent or skewed to increase the turbulent flow of the medium 60. The impeller element 51 may also rotate around the longitudinal axis X of the tube 40 to further increase the turbulent release of the medium 60.

Figure 3D:
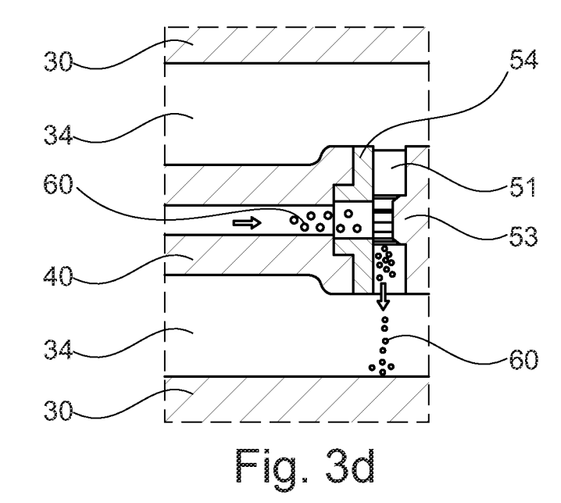

As shown in FIG. 3d, the nozzle 54 of the medium dispersion unit 50 is directly connected to the end 41 of the tube 40 exposed in the cavity 34 and configured to determine a flow rate of the medium 60. The nozzle 54 has preferably a smaller diameter than the tube 40 to increase a flow rate of the medium 60, thereby to contribute to the turbulent release of the medium 60. The plug element 53 is configured to cover the impeller element 51 in the longitudinal direction of the tube 40 such that the medium 60 can be dispersed only in the radial direction of the tube 40. When connecting the medium dispersion unit 50 to the tube 40, it is important to assemble it firmly such that no components of the medium dispersion unit 50 may become loose during dispersing the medium 60 in the cavity 34.

Figure 4:
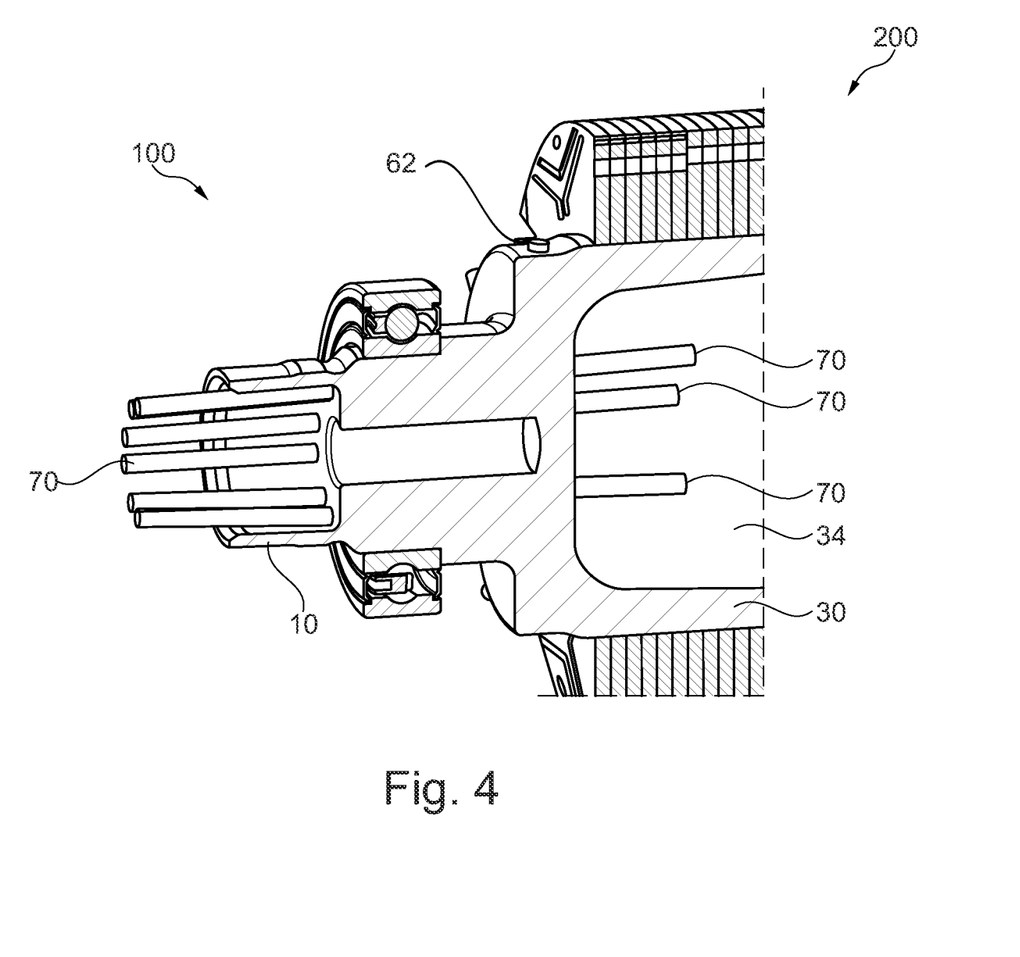
FIG. 4 shows schematically and exemplarily an embodiment of a rotor assembly according to the present disclosure.

The first shaft member 10 comprises additionally or alternatively a plurality of through-holes 61 arranged in a circumferential direction of the first shaft member 10. The through-holes 61 may be formed by means of a drilling element 70 as shown in FIG. 4. Some of the plurality of through-holes 61 extend to the cavity 34 of the body member 30. Each of the through-holes 61 may comprise a nozzle 63 or spraying means 63 arranged in direction of the cavity 34 to provide a turbulent flow of the medium 60 in the cavity 34 (see also FIG. 1).

Further, the first shaft member 10 comprises a bore 62 arranged in a radial direction of the first shaft member 10 and abutting on one of the through-holes 61, which however does not extend to the cavity 34. In other words, the through-hole 61 connected to the bore 62 is guided outside the first shaft member 10 or the rotor assembly 200. The medium 60 provided in the through-hole 61 may be dispersed in the stator unit 300 to cool the stator unit 300, hence improve a performance of the electric machine 100. The first shaft member 10 may comprise more than one bore 62 arranged in the radial direction of the first shaft member 10, wherein each bore 62 may be connected to each through-hole 61 respectively.

Figure 5:
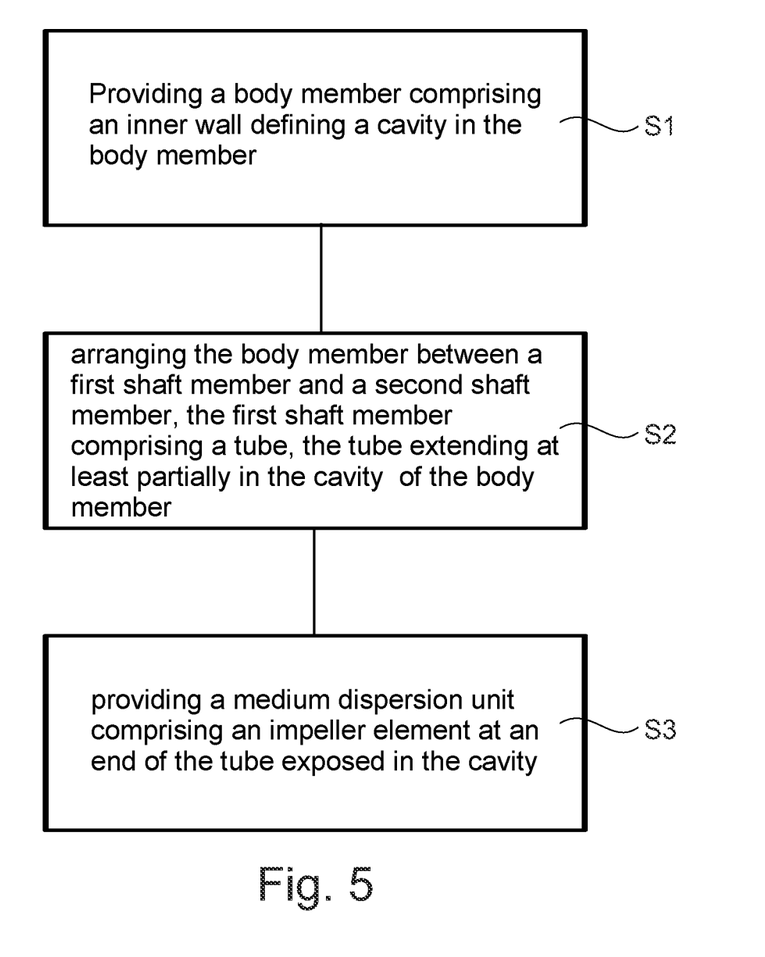
FIG. 5 shows schematically and exemplarily an embodiment of a manufacturing method of a rotor assembly according to the present disclosure.

FIG. 5 shows schematically the manufacturing method of a rotor assembly 200 for an electric machine 100. The method comprises, but not necessarily in this order:

providing S1 a body member 30 comprising an inner wall 33 defining a cavity 34 in the body member 30, arranging S2 the body member 30 between a first shaft member 10 and a second shaft member 20, the first shaft member 10 comprising a tube 40, the tube 40 extending at least partially in the cavity 34 of the body member 30, and providing S3 a medium dispersion unit 50 comprising an impeller element 51 at an end 41 of the tube 40 exposed in the cavity 34, wherein the medium dispersion unit 50 is configured to disperse a medium 60 in the cavity 34 and the impeller element 51 is configured to provide a turbulent flow of the medium 60.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

What is claimed is:

1. A rotor assembly for an electric machine, comprising a body member;
a first shaft member; and
a second shaft member;
wherein the body member comprises an inner wall defining a cavity in the body member,
wherein the body member is arranged between the first shaft member and the second shaft member,
wherein the first shaft member comprises a tube,
wherein the tube is arranged through the first shaft member and extends in the cavity of the body member to about a center of a longitudinal length of the cavity,
wherein an end of the tube exposed in the cavity comprises a medium dispersion unit configured to disperse a medium in the cavity,
wherein the medium dispersion unit comprises an impeller element configured to provide a turbulent flow of the medium,
wherein the first shaft member further comprises a plurality of through-holes arranged in a circumferential direction of the first shaft member,
wherein a first subset of the plurality of through-holes extend to the cavity along a longitudinal direction of the first shaft member, and a second subset of the plurality of through-holes extend along a longitudinal direction of the first shaft member only partially towards the cavity,
wherein the first subset of the plurality of through-holes are in fluid communication with the cavity, and the second subset of the plurality of through-holes are not in fluid communication with the cavity, and
wherein the second subset of the plurality of through-holes is formed to guide fluid directly outside the rotor assembly without passing the cavity.

2. The rotor assembly of claim 1, wherein the medium dispersion unit further comprises a nozzle configured to control a flow rate of the medium.

3. The rotor assembly of claim 2, wherein a diameter of the nozzle is smaller than a diameter of the tube.

4. The rotor assembly of claim 1, wherein the impeller element comprises arranged to rotate around a longitudinal axis of the tube.

5. The rotor assembly of claim 1, wherein the impeller element comprises a plurality of fins configured to provide the turbulent flow of the medium.

6. The rotor assembly of claim 1, wherein the medium dispersion unit further comprises a plug element to cover the impeller element in a longitudinal direction of the tube such that the medium is dispersed in a radial direction of the tube.

7. The rotor assembly of claim 1, wherein the medium dispersion unit is connected to the tube in a form-fitted manner.

8. The rotor assembly of claim 1, wherein the first shaft member further comprises a bore extending in a radial direction of the first shaft member, and the bore is in fluid communication with one of the through-holes of the second subset.

9. The rotor assembly of claim 1, wherein the inner wall of the body member is formed in a conical shape.

10. The rotor assembly of claim 1, wherein the body member comprises a channel extending from the cavity to an outside of the body member to release the medium.

11. The rotor assembly of claim 1, wherein the medium comprises an oil.

12. A rotor assembly for an electric machine, comprising
a body member;
a first shaft member; and
a second shaft member;
wherein the body member comprises an inner wall defining a cavity in the body member,
wherein the body member is arranged between the first shaft member and the second shaft member,
wherein the first shaft member comprises a plurality of through-holes,
wherein the plurality of through-holes are arranged in a circumferential direction of the first shaft member,
wherein a first subset of the plurality of through-holes extend to the cavity along a longitudinal direction of the first shaft member to be in in fluid communication with the cavity,
wherein a second subset of the plurality of through-holes extend along a longitudinal direction of the first shaft member only partially towards the cavity to not be in fluid communication with the cavity, and
wherein the second subset of the plurality of through-holes is formed to guide fluid directly outside the rotor assembly without passing the cavity.

13. The rotor assembly of claim 12, wherein each of first subset of the plurality of through-holes comprises a nozzle arranged in direction of the cavity to provide a turbulent flow of a medium in the cavity.

14. The rotor assembly of claim 12, wherein the first shaft member further comprises a bore extending in a radial direction of the first shaft member, and the bore is in fluid communication with one of the through-holes of the second subset.

15. The rotor assembly of claim 12, wherein the inner wall of the body member is formed in a conical shape.

16. An electric machine, comprising
a stator unit; and
a rotor assembly comprising a body member, a first shaft member, and a second shaft member,
wherein the body member comprises an inner wall defining a cavity in the body member,
wherein the body member is between the first shaft member and the second shaft member,
wherein the first shaft member comprises a tube,
wherein the tube is arranged through the first shaft member and extends-in the cavity of the body member to less than midway of a longitudinal length of the cavity,
wherein an end of the tube exposed in the cavity comprising a medium dispersion unit configured to disperse a medium in the cavity,
wherein the medium dispersion unit comprises an impeller element configured to provide a turbulent flow of the medium,
wherein the rotor assembly is arranged coaxially inside the stator unit and is configured to rotate around a longitudinal axis of the electric machine wherein the first shaft member further comprises a plurality of through-holes arranged in a circumferential direction of the first shaft member,
wherein a first subset of the plurality of through-holes extend to the cavity along a longitudinal direction of the first shaft member, and a second subset of the plurality of through-holes extend along a longitudinal direction of the first shaft member only partially towards the cavity,
wherein the first subset of the plurality of through-holes are in fluid communication with the cavity, and the second subset of the plurality of through-holes are not in fluid communication with the cavity, and
wherein the second subset of the plurality of through-holes is formed to guide fluid directly outside the rotor assembly without passing the cavity.

17. The electric machine of claim 16, wherein the body member of the rotor assembly comprises a channel extending from the cavity to an outside of the body member to release the medium from the body member to the stator unit, and wherein the inner wall of the body member is formed in a conical shape.

18. The electric machine of claim 16, wherein the impeller element comprises arranged to rotate around a longitudinal axis of the tube.

19. The electric machine of claim 16, wherein the impeller element comprises a plurality of fins configured to provide the turbulent flow of the medium.

20. The electric machine of claim 16, wherein the medium dispersion unit further comprises a nozzle configured to control a flow rate of the medium.

* * * * *